United States Patent Office 3,226,386
Patented Dec. 28, 1965

3,226,386
HYDROGENOLYSIS OF TRICHLOROMETHYL-SUBSTITUTED COMPOUNDS
Ehrenfried H. Kober, Hamden, Conn., assignor to Olin Mathieson Chemical Corporation, a corporation of Virginia
No Drawing. Filed July 20, 1962, Ser. No. 211,413
17 Claims. (Cl. 260—248)

This invention relates to the hydrogenolysis of trichloromethyl-substituted compounds. More particularly, this invention relates to a novel process for substituting a hydrogen atom for one chlorine atom in each trichloromethyl group of an organic compound containing at least one trichloromethyl-substituent. Hydrogen-substituted compounds of this type are useful as intermediates, and in the preparation of allergenics and vesicants. For example, the dichloromethyl-s-triazine compounds described in U.S. Patent No. 3,022,303, issued February 20, 1962, to Christoph J. Grundmann et al. may be prepared by the process of this invention. In addition, the dichloroacetamidine reactants disclosed in U.S. Patent No. 2,876,221, issued March 3, 1959, to H. Schroeder et al., may be prepared by the process of this invention.

It has now been discovered that a hydrogen atom is substituted for one chlorine atom in each trichloromethyl group of a trichloromethyl-substituted organic compound when the trichloromethyl-substituted organic compound is reacted with a sulfhydryl compound in the presence of a tertiary amine. This result is surprising in view of the results obtained in previous tests wherein trichloromethyl groups were completely replaced with alkoxy groups when trichloromethyl-s-triazine compounds were reacted with alcohol in the presence of tertiary amines, as disclosed in U.S. Patent No. 3,014,907, by Ehrenfried H. Kober, issued Dec. 26, 1961. This result is also surprising in view of the results obtained when 2,4,6-tris(trichloromethyl)-s-triazine was reacted with water in the presence of tertiary amines to yield the teritary amine salt of 2,4-bis(trichloromethyl)-6-hydroxy-s-triazine as disclosed in U.S. Patent application Serial No. 817,988, filed June 4, 1959 by Ehrenfried H. Kober, now U.S. Patent No. 3,090,784.

It is believed that the reaction proceeds according to Equation I, as follows:

(I)    $R'—CCl_3+2R''SH+(R''')_3N\rightarrow$
               $R'—CHCl_2+R''SSR''+(R''')_3N·HCl$ where R', R" and R'" are as defined below.

When an excess of the tertiary amine and hydrogen sulfide compound is used, the dichloromethyl compound, R'CHCl₂, reacts further to yield a thio-acetal according to Equation II, as follows:

(II)    $R'CHCl_2+2R''SH+2(R''')_3N\rightarrow$
               $R'CH(SR'')_2+2(R''')_3N·HCl$ where R', R" and R'" have the meaning defined below.

Organic compounds suitable for use as the trichloromethyl-substituted compound are those organic compounds having at least one trichloromethyl-group in the alpha position to an electronegative group. Compounds of this type have the formula R'CCl₃, where R' is selected from the group consisting of —C≡N, —CONH₂, —COOH, —COOR, where R is an alkyl radical containing between 1 and about 8 carbon atoms or an aryl radical containing between about 6 and about 10 carbon atoms, and the like. Other compounds of this type are trichloromethyl-substituted-s-triazines, 2-trichloromethyl-substituted-s-pyrimidines, and other heterocyclic nitrogen compounds which have the CCl₃-group attached to a ring carbon atom adjacent to a ring nitrogen atom. Examples of suitable trichloromethyl-substituted compounds include trichloroacetic acid,
trichloroacetonitrile,
ethyl trichloroacetate,
trichloroacetamide,
2,4,6-tris(trichloromethyl)-s-triazine,
2-methyl-4-,6-bis(trichloromethyl)-s-triazine,
2,4-bis(methoxy)-6-trichloromethyl - s - triazine, and the corresponding ethoxy, propoxy and n-butoxy substituted triazines;
2-methoxy-4,6-bis(trichloromethyl)-s-triazine and the corresponding ethoxy, propoxy, and n-butoxy substituted triazines;
2-trichloromethyl-4,6-(carboethoxy)-s-triazine,
2,4-bis(trichloromethyl)-6-(carboethoxy)-s-triazine,
2-trichloromethyl-4-,6-bis(p-chlorophenyl)-s-triazine,
2,4-bis(trichloromethyl)-6-phenyl-s-triazine,
2-trichloromethyl-4,6-diamino-s-triazine,
2-trichloromethyl-4,6-bis(methylamino) - s - triazine, and the corresponding ethylamino, propylamino, n-butylamino, and phenylamino substituted triazines;
2-trichloromethyl-4,6-bis(dimethylamino)-s-triazine, and the corresponding diethylamino, dipropylamino, di-n-butylamino, and N,N-diphenylamino substituted triazines;
2-trichloromethyl-4-amino-6-methyl-s-triazine,
2-trichloromethyl-4-amino-6-phenyl-s-triazine;
2-trichloromethyl-4,6-bis(methyl)pyrimidine,
4-trichloromethyl-pyrimidine,
4,6-bis(trichloromethyl)-pyrimidine,
2,4-bis(trichloromethyl)-pyrimidine,
2,4,6-tris(trichloromethyl)-pyrimidine,
2-trichloromethyl-pyrazine,
2,3-bis(trichloromethyl)-pyrazine,
2,5-bis(trichloromethyl)-pyrazine,
2,6-bis(trichloromethyl)-pyrazine,
3-trichloromethyl-pyidazine,
3,6-bis(trichloromethyl)-pyridazine,
2-trichloromethyl-pyridine,
2-trichloromethyl-quinoline,
3-trichloromethyl-pyrazol,
2-trichloromethyl-4-phenylimidazole,
2-trichloromethyl-5-ethoxy-1,2,4-thiadiazole, mixtures thereof, and the like. Corresponding tribromomethyl compounds may also be used.

Sulfhydryl compounds suitable for use as a reactant in the novel process are represented by the formula R"SH, where R" is selected from the group consisting of hydrogen, an alkyl group containing between 1 and about 8 carbon atoms, an aryl group containing between about 6 and about 10 carbon atoms, a halogen-substituted akyl group, a halogen-substituted aryl group, and the like. For example, hydrogen sulfide, methyl mercaptan, butyl mercaptan, isopropyl mercaptan, octyl mercaptan, phenyl mercaptan, cresyl mercaptan, naphthyl mercaptan, chloropropyl mercaptan, chlorooctyl mercaptan, chlorophenyl mercaptan, chloronaphthyl mercaptan, mixtures thereof, and the like are suitable for use as the sulfhydryl compound.

Any tertiary amine capable of acting as a hydrogen chloride acceptor may be employed in the process of this invention. In Equations I and II above, the tertiary amine is shown as $(R''')_3N$, which represents (A) trialkylamines of the formula $R^a_3N$, where $R^a$ is an alkyl radical having from 1 to 5 carbon atoms, such as trimethylamine, triethylamine, tripropylamine, tributylamine, triamylamine, and the like; (B) cyclic amines of the formula:

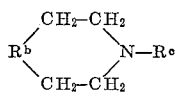

where $R^b$ is selected from the group consisting of oxygen and methylene groups and wherein $R^c$ is an alkyl group having from 1 to 5 carbon atoms, such as N-ethyl piperidine and N-methyl morpholine; and (C) nicotine.

The reaction may be carried out using stoichiometric proportions of reactants, as set forth in Equation I above in order to yield a reaction product predominating in the dichloromethyl-substituted compound. When it is desired to substitute two of the chlorine atoms in the resulting dichloromethyl groups with two of the R″S-groups, the stoichiometric proportions set forth in Equations I and II are employed. If desired, an excess above the stoichiometric proportions of the teriary amine and/or sulfhydryl compounds may be employed.

When carrying out the reaction of this invention, the trichloromethyl-substituted organic compound may be dissolved in or admixed with the tertiary amine, and then the sulfhydryl compound is admixed with the resultant solution or dispersion. However the reactants may be added simultaneously to the reaction zone in the above-mentioned proportions.

The reaction is carried out initially at a temperature between about −25 and about 20° C., and preferably between about −20 and about 0° C., and then permitted to increase to about 20° C. up to about 100° C., and preferably within the range between about 20 and about 30° C. When hydrogen sulfide is employed as the sulhyhydryl compound, the gaseous reactant is added slowly during the initial period and preferably continued during the period in which the temperature is increased from the initial temperature to about room temperature.

If desired, the reaction may be carried out in the presence of an inert solvent or diluent such as benzene, dioxane, ether, or the like.

The reaction period will vary with the type of reactants and the proportions of reactants employed. However the desired degree of reaction is generally completed within a period of between about 2 and about 24 hours.

The reaction may be carried out under atmospheric or superatmospheric pressure, but preferably atmospheric pressure is employed.

After the reaction period is completed, the reaction mixture is subjected to filtration or other suitable separation techniques to remove the solid tertiary amine salts formed. The solid salts may be washed with a solvent such as ether to remove any product that may be adhering to the solid salt. The solvent wash is then combined with the filtrate, and the resulting mixture is distilled to separate the tertiary amines, the sulfur-containing by-product formed and reactants from the hydrogen-substituted product. The product may be further purified by filtration, distillation, recrystallization, or other purification techniques.

The following examples are presented to define the invention more fully without any intention of being limited thereby. All parts and percentages are by weight unless otherwise specified.

EXAMPLE I

Triethylamine (33 grams) and methylmercaptan (100 grams) were added with stirring to trichloroacetamide (32.4 grams) at a temperature of −20° C. The temperature of the reaction mixture increased to room temperature in about 6 hours, and was maintained at this temperature for an additional 18 hours. Ether (200 milliliters) was then admixed with the reaction mixture, and filtered. The solid filter cake was thoroughly washed with ether and the wash solution was combined with the original filtrate. The filtrate was then distilled to separate low boiling fractions and to yield a crude dichloroacetamide product which was dissolved in ether (100 milliliters) and then reprecipitated with Skellysolve C. The purified dichloroacetamide product (22.15 grams) had a melting point of about 96° C. A mixed melting point test with a commercially available sample showed no depression.

The washed filter cake, which weighed 54 grams, was recrystallized from 250 milliliters of hot water to yield upon cooling 6.6 grams of white crystals, leaving the triethylamine hydrochloride in solution. The white crystals were extracted with 400 milliliters Skellysolve C, and again recrystallized from water (80 milliliters) to give fine, white needles which were identified as 1,1-bis-thiomethylacetamide having a melting point of about 146° C.

Chemical analyses and the theoretical analyses of the 1,1-bis-thiomethylacetamide product are as follows:

| Element | Analyzed Weight Percent | Theoretical Weight Percent |
|---|---|---|
| Carbon | 31.96 | 31.79 |
| Hydrogen | 6.09 | 6.01 |
| Nitrogen | 9.37 | 9.27 |
| Sulfur | 41.99 | 42.34 |

EXAMPLE II

Triethylamine (46 grams) and methylmercaptan (100 grams) were added with stirring to ethyl trichloroacetate (40.9 grams) at a temperature of −20° C. The temperature of the reaction mixture was permitted to increase to room temperature in a period of about 4 hours. The resulting precipitated triethylamine hydrochloride was filtered and washed with ether. The wash solution was combined with the original filtrate. The combined filtrates were distilled leaving an oily residue which was fractionated in vacuo to yield two principal fractions. The lower boiling fraction consisted of ethyl dichloroacetate (8.9 grams) having a boiling point of between about 70.5 and 73.5° C. at 30 millimeters of mercury. The refractive index at 26° C. was 1.4397, as compared to a literature reference which indicated the refractive index to be about 1.4386 under these conditions. Chemical analyses and theoretical analyses for the ethyl dichloroacetate ($C_4H_6Cl_2O_2$) were as follows:

| Element | Analyzed Weight Percent | Theoretical Weight Percent |
|---|---|---|
| Carbon | 30.91 | 30.61 |
| Hydrogen | 3.99 | 3.85 |
| Chlorine | 43.89 | 45.17 |

The higher boiling fraction consisted of ethyl-1,1-bis-thiomethylacetate (16 grams) which had a boiling point between 98–102° C. at 8 millimeters of mercury and a refractive index at 27° C. of 1.5069. Chemical analyses and theoretical analyses for the ethyl-1,1-bis-thiomethylacetate ($C_6H_{12}S_2O_2$) were found to be as follows:

| Element | Analyzed Weight Percent | Theoretical Weight Percent |
|---|---|---|
| Carbon | 39.86 | 39.97 |
| Hydrogen | 6.72 | 6.71 |
| Sulfur | 35.72 | 35.57 |
| Chlorine | 0 | 0 |

EXAMPLE III

Triethylamine (29 grams) and n-butylmercaptan (75 milliliters) were added, with stirring, to 2,4,6-tris-trichloromethyl-s-triazine (33 grams) at 0° C. and the resulting mixture was stirred for 6 hours. The resulting precipitated triethylamine hydrochloride was separated by filtration, and triethylamine and di-n-butyldisulfide were separated from the filtrate by distillation in vacuo. The distillation residue (19.5 grams) was solidified by cooling to room temperature and dissolved in hot Skellysolve C and precipitated at room temperature to yield crystals identified as 2,4,6-tris-dichloromethyl-s-triazine (9.7 grams). These crystals had a melting point of 68° C., which compared favorably with the melting point of 65° C. set forth in the literature for this compound. A mixed melting point test with known 2,4,6-tris-dichloromethyl-s-triazine showed no depression. Chemical analyses and theoretical analyses of the 2,4,6-tris-dichloromethyl-s-triazine product ($C_6H_3N_3Cl_6$) were found to be as follows:

| Element | Analyzed Weight Percent | Theoretical Weight Percent |
| --- | --- | --- |
| Carbon | 21.79 | 21.82 |
| Hydrogen | 0.92 | 0.91 |
| Nitrogen | 12.88 | 12.74 |
| Chlorine | 64.47 | 64.56 |

EXAMPLE IV

Ethyl mercaptan (100 grams) and triethylamine (31 grams) were added, with stirring, to 2,4,6-tris-trichloromethyl-s-triazine (33 grams) at a temperature of 0° C. After 2 hours the solid triethylamine hydrochloride which precipitated was separated by filtration and washed with Skellysolve F on the filter plate. The wash solution was combined with the filtrate, and the resulting mixture was distilled to separate triethylamine and diethyldisulfide yielding an oily distillation residue. This residue was subjected to fractional distillation in vacuo yielding, as a precipitate in the receiver, 2,4,6-tris-dichloromethyl-s-triazine (16.13 grams). This compound distilled off at a temperature between 145–151.5° C. at 0.6 millimeter of mercury, and the resulting solid, which precipitated in the receiver, had a melting point of 66.5–68° C. A mixed melting point test carried out with a known sample of 2,4,6-tris-dichloromethyl-s-triazine showed no depression.

EXAMPLE V

Hydrogen sulfide was passed into a solution of 2,4,6-tris(trichloromethyl)-s-triazine (33 grams), triethylamine (35.1 grams), and ether (200 milliliters) at 0° C. for 7 hours. The reaction mixture was allowed to stand at room temperature for about 12 hours. Ether (250 milliliters) was added to the reaction mixture and the solid salts and sulfur formed in the reaction mixture were separated by filtration. Ether was distilled from the filtrate and the resulting dark residue, after dissolving in 25 milliliters of Skellysolve C, was cooled to a temperature of −20° C., which caused crystals and an oily product to separate from the Skellysolve C. The crystals were freed from adhering oil by pressing on a clay plate. The crystal product (5.96 grams) was found to be 2,4,6-tris-dichloromethyl-s-triazine which had a melting point between 65–67° C. A mixed melting point test using a known sample of the compound showed no depression.

EXAMPLE VI

Triethylamine (31 grams) and methanethiol (100 grams) were added, with stirring, to 2-methyl-4,6-bis-trichloromethyl-s-triazine (30.5 grams) at −20° C. and the temperature of the reaction mixture was then allowed to increase to room temperature while stirring was continued. The reaction mixture was filtered to separate solid triethylamine hydrochloride, and the wash solution obtained by washing the filter cake with ether was combined with the filtrate. The resulting mixture was then distilled to separate ether, triethylamine, and dimethyldisulfide. The distillation residue was subjected to fractional distillation to yield a first fraction at a boiling point of 128–142° C. at 0.2 millimeter of mercury. This fraction, which crystallized in the condenser was comprised mainly of 2-methyl-4,6-bis-dichloromethyl-s-triazine (23.03 grams).

This compound was dissolved in hot Skellysolve C and recrystallized on cooling to yield 6.2 grams of colorless prisms having a melting point of 88–90° C. Chemical analyses and theoretical analyses of the 2-methyl-4,6-bis-dichloromethyl-s-triazine ($C_6H_4N_3Cl_4$) were found to be as follows:

| Element | Analyzed Weight Percent | Theoretical Weight Percent |
| --- | --- | --- |
| Carbon | 27.69 | 27.62 |
| Hydrogen | 1.97 | 1.91 |
| Nitrogen | 16.28 | 16.11 |
| Chlorine | 54.04 | 54.35 |

After removing the crystals from the condenser, fractionation was continued to yield a yellowish oil at a boiling point of 120–122° C. at 0.07 millimeter of mercury. This liquid, which had a refractive index at 20° C. of 1.5869, was identified as the thiomethylacetal of the 2-methyl-4-dichloromethyl-s-triazine-6-aldehyde. Chemical analyses and theoretical analyses for this compound ($C_8H_{11}N_3Cl_2S_2$) were found to be as follows:

| Element | Analyzed Weight Percent | Theoretical Weight Percent |
| --- | --- | --- |
| Carbon | 34.11 | 33.82 |
| Hydrogen | 4.18 | 3.90 |
| Nitrogen | 15.28 | 14.79 |
| Chlorine | 24.33 | 24.95 |
| Sulfur | 22.58 | 22.56 |

EXAMPLE VII 2,4-dichloro-6-trichloromethyl-s-triazine (39 grams) was dissolved, with stirring, in the solution of sodium (6.7 grams) in methanol (150 milliliters) at a temperature of 0° C. After a period of 6 hours, sodium chloride was separated by filtration. Methanol was distilled from the filtrate by vacuum distillation at room temperature to yield an oily residue, which was mixed with ether, which caused precipitation of a solid. The solid was separated by filtration and ether was removed from the filtrate by distillation. The oily distillation residue was fractionally distilled to yield 18.5 grams of 2,4-bis-methoxy-6-trichloromethyl-s-triazine at a boiling point of 100–103° C. at 0.6 millimeter of mercury. The refractive index of this compound at 29° C. was 1.5228. Chemical analyses and theoretical analyses of this compound ($C_6H_6N_3Cl_3O_2$) were as follows:

| Element | Analyzed Weight Percent | Theoretical Weight Percent |
| --- | --- | --- |
| Carbon | 27.89 | 27.88 |
| Hydrogen | 2.39 | 2.34 |
| Nitrogen | 16.14 | 16.26 |
| Chlorine | 41.41 | 41.15 |

About 17.25 grams of 2,4-bis-methoxy-6-trichloromethyl-s-triazine produced above was reacted with triethylamine (15 grams) and methanethiol (50 grams) at −20° C., and the temperature of the reaction mixture was allowed to increase to room temperature while stirring. Triethylamine hydrochloride (16.7 grams) was separated from the reaction mixture by filtration and the wash solution obtained by washing the filter cake with ether was then combined with the filtrate. The filtrate was distilled from ether, triethylamine, and dimethyldisulfide. The distillation residue was subjected to fractional distillation in vacuo. The fraction boiling at a temperature of 90–93° C. at 0.06 millimeter of mercury was comprised of 2,4-bis-methoxy-6-dichloromethyl-s-triazine (9.1 grams). This material had a refractive index at 26° C. of 1.5197.

A higher boiling fraction, which apparently was the thiomethylacetal of 2,4-bis-methoxy-s-triazinyl-6-aldehyde was obtained in a yield of about 1.1 grams.

EXAMPLE VIII

Triethylamine (10 grams) and methanethiol (100 grams) were added, with stirring, to 2,4-bis-n-butoxy-6-trichloromethyl-s-triazine at —20° C. The temperature of the reaction mixture was allowed to increase to room temperature, and the reaction mixture was then filtered to separate the triethylamine hydrochloride which formed. The wash solution obtained by washing the filter cake with ether was combined with the filtrate and the resulting mixture was distilled to separate ether, triethylamine and dimethyldisulfide. The distillation residue was subjected to fractional distillation to yield a fraction at a boiling point of 153.5–157° C. at 1.4 millimeters of mercury. This fraction, which was identified as 2,4-bis-n-butoxy-6-dichloromethyl-s-triazine (5.81 grams) had a refractive index at 26.5° C. of 1.4968. Chemical analyses and theoretical analyses for this compound ($C_{12}H_{19}N_3Cl_2O_2$) were as follows:

| Element | Analyzed Weight Percent | Theoretical Weight Percent |
|---|---|---|
| Carbon | 47.19 | 46.76 |
| Hydrogen | 6.43 | 6.22 |
| Nitrogen | 13.64 | 13.64 |
| Chlorine | 22.72 | 23.01 |

A second fraction obtained at a boiling point of 136–146° C. at a pressure of 0.2 millimeter of mercury appeared to be a mixture of 2,4-bis-n-butoxy-6-dichloromethyl-s-triazine and thiomethylacetal of 2,4-bis-n-butoxy-s-triazinyl-6-aldehyde, as indicated by combustion analysis which showed a sulfur content, as organically bound sulfur, 9.91 percent.

EXAMPLE IX 2-trichloromethyl-4,6-bis-methyl-pyrimidine (54 grams) prepared as described in U.S. Patent application Serial No. 211,415, filed July 20, 1962, by Hansjuergen Schroeder, now U.S. Patent No. 3,118,889, was admixed with triethylamine (45 grams) and methanethiol (100 grams) at a temperature of —20° C. The temperature of the reaction mixture was permitted to increase to room temperature and the reaction mixture was then filtered to separate the solid triethylamine hydrochloride. The wash solution obtained by washing the filter cake with ether was combined with the filtrate, and the resulting mixture was distilled to separate ether, triethylamine, and dimethyldisulfide. The resulting solid residue was dissolved in hot Skellysolve C and recrystallized on cooling to yield 32 grams of solid having a melting point of 127–135° C. This material is identified as a mixture of unreacted starting materials and 2-dichloromethyl-4,6-bis-methylpyrimidine.

It will be recognized by those skilled in the art that various modifications of the invention, some of which have been referred to above, may be employed, without departing from the scope of the invention. Therefore I do not wish to be limited except as defined by the appended claims.

I claim:
1. The process of substituting a hydrogen atom for one chlorine atom in each trichloromethyl group in a trichloromethyl-substituted organic compound, which comprises reacting an organic compound having at least one trichloromethyl group in the alpha position to an electronegative group with a sulfhydryl compound in the presence of a tertiary amine at an initial reaction temperature in the range between —25 and about 20° C.
2. The process of claim 1 wherein said organic compound is ethyl trichloroacetate.
3. The process of claim 1 wherein said organic compound is trichloroacetonitrile.
4. The process of claim 1 wherein said organic compound is trichloroacetamide.
5. The process of claim 1 wherein said organic compound is a trichloromethyl-substituted-s-triazine.
6. The process of claim 1 wherein said organic compound is a trichloromethyl-substituted-pyrimidine.
7. The process of claim 1 wherein said sulfhydryl compound is hydrogen sulfide.
8. The process of claim 1 wherein said sulfhydryl compound is an alkyl mercaptan wherein said alkyl group contains between 1 and about 8 carbon atoms.
9. The process of claim 1 wherein said sulfhydryl compound is an aryl mercaptan, said aryl mercaptan having an aryl substituent containing between 6 and about 10 carbon atoms.
10. The process of claim 1 wherein said tertiary amine is a trialkylamine in which each alkyl radical has between 1 and about 5 carbon atoms.
11. The process of claim 1 wherein said tertiary amine is a cyclic amine of the formula:

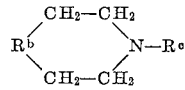

where $R^b$ is selected from the group consisting of oxygen and methylene groups and wherein $R^c$ is an alkyl group having from 1 to 5 carbon atoms.
12. The process of claim 1 wherein said tertiary amine is nicotine.
13. The process of claim 1 wherein the proportion of reactants are about the stoichiometric proportions of about two moles of said sulfhydryl compound and one mole of said tertiary amine per mole of said trichloromethyl-substituted organic compound.
14. The process for preparing dichloroacetamide which comprises reacting trichloroacetamide with triethylamine and methyl mercaptan at an initial reaction temperature in the range between about —25 and about 20° C.
15. The process for preparing ethyl dichloroacetate which comprises reacting ethyl trichloroacetate with triethylamine and methyl mercaptan at an initial reaction temperature in the range between about —25 and about 20° C.
16. The process for preparing 2,4,6-tris-dichloromethyl-s-triazine which comprises reacting 2,4,6-tris-trichloromethyl-s-triazine with triethylamine and n-butyl mercaptan at an initial reaction temperature in the range between about —25 and about 20° C.
17. The process for preparing 2,4,6-tris-dichloromethyl-s-triazine which comprises reacting 2,4,6-tris-trichloromethyl-s-triazine with triethylamine and hydrogen sulfide at an initial reaction temperature in the range between about —25 and about 20° C.

References Cited by the Examiner

Quam: Journ. of the Am. Chem. Soc., vol. 47, pp. 103 to 108 (1925).

Steinkopf et al.: Ber. Deut. Chem., vol. 56, pp. 1930–1932 (1923).

JOHN D. RANDOLPH, *Acting Primary Examiner.*